W. T. NICHOLSON.
File-Handles.
No. 198,777. Patented Jan. 1, 1878.
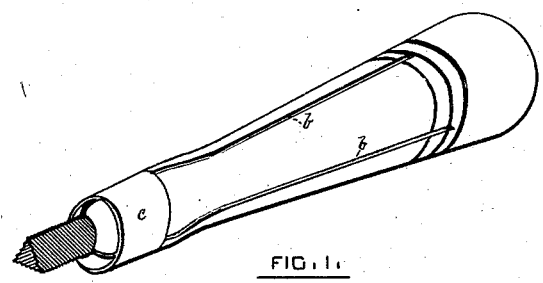
FIG. 1.
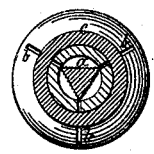
FIG. 2.
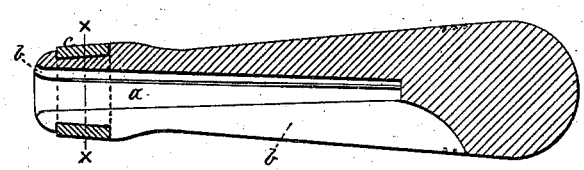
FIG. 3.
ATTEST: INVENTOR.
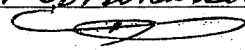

UNITED STATES PATENT OFFICE.

WILLIAM T. NICHOLSON, OF PROVIDENCE, RHODE ISLAND, ASSIGNOR TO THE NICHOLSON FILE COMPANY, OF SAME PLACE.

IMPROVEMENT IN FILE-HANDLES.

Specification forming part of Letters Patent No. 198,777, dated January 1, 1878; application filed December 6, 1877.

*To all whom it may concern:*

Be it known that I, WILLIAM T. NICHOLSON, of the city and county of Providence, in the State of Rhode Island, have invented certain new and useful Improvements in File-Handles; and I hereby declare that the following specification, taken in connection with the drawings furnished and forming a part of the same, is a clear, true, and complete description thereof.

The object of my invention is to provide a handle which will receive and securely hold a file by its tang, and which can readily be applied to hold files of different sized tangs. It is also especially useful for holding that description of files which have no tang proper, but are tapering in both directions, from the middle toward the ends.

It consists in a file-handle which is chambered at one end, and constructed so that it shall be expansible, for grasping and holding tangs or tapered double files of various sizes, as hereinafter described.

To more particularly describe my invention, I will refer to the accompanying drawings, in which Figure 1 is a perspective of one of my handles occupied by a file. Fig. 2 is a lateral section, and Fig. 3 a longitudinal section, of the same.

The handle here shown is adapted to receive a three-cornered tapering double file. The chamber $a$ is circular in outline, and is cut out with a tapering bit. The longitudinal slots $b$ are equidistant from each other, and extend from the front end of the handle to the inner end of the chamber. The front end of the handle is provided with an annular recess. The slots permit the compression of said outer end, so as to receive into the annular recess the ferrule $c$. The ferrule $c$ is made of rubber, or some suitable elastic material, and acts as a compress, to cause the spring end of the slotted handle to grasp the file or file-tang, which has been crowded into the opening in the handle to receive the same.

For a three-cornered-file handle, three of these slots are provided, so that each is occupied by a corner of the file, as shown in Fig. 2. For a square file, four of these slots would be desirable.

It will be seen that a file, when properly entered into such a handle, will be securely held against rotation, and equally secure against longitudinal displacement.

Having thus described my invention, I claim as new and desire to secure by Letters Patent—

A file-handle chambered at one end to receive a file or file-tang, and slotted radially, as described, and provided with an elastic compress, the article being substantially as specified.

WM. T. NICHOLSON.

Witnesses:
I. KNIGHT,
THOMAS F. COSGROVE.